(12) United States Patent
Ho

(10) Patent No.: US 8,770,740 B2
(45) Date of Patent: Jul. 8, 2014

(54) EYEWEAR

(71) Applicant: Patrick C. Ho, Hilton, NY (US)

(72) Inventor: Patrick C. Ho, Hilton, NY (US)

(73) Assignee: Alpha Primitus, Inc., Central (HK)

( * ) Notice: Subject to any disclaimer, the term of this patent is extended or adjusted under 35 U.S.C. 154(b) by 0 days.

(21) Appl. No.: 13/896,948

(22) Filed: May 17, 2013

(65) Prior Publication Data

US 2013/0265539 A1 Oct. 10, 2013

Related U.S. Application Data

(63) Continuation of application No. 12/804,850, filed on Jul. 30, 2010, now Pat. No. 8,454,155.

(51) Int. Cl.
*G02C 5/16* (2006.01)
*G02C 5/06* (2006.01)

(52) U.S. Cl.
CPC ... *G02C 5/06* (2013.01); *G02C 5/16* (2013.01)
USPC ............ 351/114; 351/125; 351/126; 351/130

(58) Field of Classification Search
CPC ............ G02C 5/06; G02C 1/06; G02C 3/003; G02C 5/16
USPC ............. 351/41, 43, 103–109, 111–135, 158; 2/209.13
See application file for complete search history.

(56) References Cited

U.S. PATENT DOCUMENTS

| 915,487 | A | 3/1909 | Savoie |
|---|---|---|---|
| 1,705,229 | A | 3/1929 | Welsh |
| 1,706,083 | A | 3/1929 | Simonds |
| 1,743,796 | A | 1/1930 | Nelson |
| D89,677 | S | 4/1933 | Belgard |
| 1,952,890 | A | 3/1934 | Poeton |
| 2,194,776 | A | 3/1940 | Sweeney |
| 2,196,872 | A | 4/1940 | Pomeranz |
| 2,250,243 | A | 7/1941 | Williams |
| 2,268,908 | A | 1/1942 | Shockey |
| 2,301,325 | A | * 11/1942 | Reiss et al. ..................... 351/109 |
| 2,310,133 | A | 2/1943 | Uhlemann et al. |
| 2,365,163 | A | 12/1944 | Alexander |
| 2,374,171 | A | 4/1945 | Breuker, Jr. |
| 2,388,713 | A | 11/1945 | Schutz et al. |
| 2,396,207 | A | 3/1946 | Schutz et al. |

(Continued)

*Primary Examiner* — Huy K Mai

(74) *Attorney, Agent, or Firm* — Joseph M. Noto; Bond Schoeneck & King PLLC

(57) ABSTRACT

Eyewear which is suitable for routine wear and within masks which are sealed against noxious environmental gases or penetration by water is provided by a frame made up of resilient metal parts including wires to provide the frame with a shape, which facilitates the placement of the eyewear on the head of the user while limiting the movement of the eyewear when in use so as to avoid breaking the seal of a mask inside of which the eyewear is disposed when the mask is donned by the user. The eyewear has a lens holding frame for holding lenses adjacent the eyes of the user's head and connected by a bridge across the user's nose. Flexible members bent arcuately around and in conformance with the sides of the head of the user have a kink whereby to facilitate acceptance between the sides of the head and the seal of the mask with sufficient tightness against the side of the head to limit movement of the frame and the space between the seal and the head thereby avoiding breaking of the seal when the mask is in operation.

13 Claims, 11 Drawing Sheets

(56) References Cited

U.S. PATENT DOCUMENTS

| | | |
|---|---|---|
| 2,564,961 A | 8/1951 | Culver et al. |
| D164,889 S | 10/1951 | Weissman |
| 2,905,172 A | 9/1959 | Rodenhouse |
| 2,962,722 A | 12/1960 | Curran |
| 2,993,209 A | 7/1961 | Monahan, Jr. et al. |
| 3,146,295 A | 8/1964 | Roland |
| 3,182,658 A | 5/1965 | Klinger |
| 3,288,547 A | 11/1966 | Klinger et al. |
| 3,563,640 A | 2/1971 | Wise et al. |
| 3,944,344 A | 3/1976 | Wichers |
| 4,023,214 A | 5/1977 | Waldherr |
| 4,105,026 A | 8/1978 | Hay, II |
| 4,129,362 A | 12/1978 | Lorenzo |
| 4,391,498 A | 7/1983 | Rengstorff |
| 4,488,792 A | 12/1984 | Wagner |
| 4,711,539 A | 12/1987 | Krusas et al. |
| 4,723,844 A | 2/1988 | Medina |
| 4,810,080 A | 3/1989 | Grendol et al. |
| 4,930,163 A | 6/1990 | King |
| 4,965,887 A | 10/1990 | Paoluccio et al. |
| D351,396 S | 10/1994 | Conway |
| 5,367,344 A * | 11/1994 | Fuchs .............................. 351/41 |
| D367,876 S | 3/1996 | Rabut |
| D371,568 S | 7/1996 | Nakabayashi |
| D377,803 S | 2/1997 | Wilson |
| D379,191 S | 5/1997 | Flanagan |
| D381,671 S | 7/1997 | Tan et al. |
| 5,666,181 A | 9/1997 | Conway |
| D392,305 S | 3/1998 | Peschel et al. |
| D392,306 S | 3/1998 | Arnette |
| 5,745,210 A * | 4/1998 | Biernat et al. .................. 351/41 |
| D399,242 S | 10/1998 | Raub |
| D405,818 S | 2/1999 | De Bruyn |
| D410,940 S | 6/1999 | Raub |
| D411,223 S | 6/1999 | Simioni |
| 6,000,795 A | 12/1999 | Van Rysselberghe |
| 6,019,468 A | 2/2000 | Altemare, Jr. |
| D422,014 S | 3/2000 | Simioni et al. |
| D426,848 S | 6/2000 | Hartman |
| D434,790 S | 12/2000 | Lepeu et al. |
| D443,633 S | 6/2001 | Lazarides |
| 6,511,174 B1 | 1/2003 | Rossin |
| 6,591,459 B2 | 7/2003 | Muller et al. |
| D482,384 S | 11/2003 | Thiele et al. |
| 6,719,425 B2 | 4/2004 | Conner |
| 6,886,934 B2 | 5/2005 | Asman et al. |
| 6,902,636 B2 | 6/2005 | Jee |
| D523,061 S | 6/2006 | Asman et al. |
| D539,834 S | 4/2007 | Hester |
| D546,368 S | 7/2007 | Park |
| D556,819 S | 12/2007 | Fuchs |
| 7,347,544 B1 | 3/2008 | McLaughlin |
| 7,494,218 B1 | 2/2009 | Rotella |
| 7,677,724 B1 | 3/2010 | Erickson et al. |
| 7,703,914 B2 | 4/2010 | Maling |

\* cited by examiner

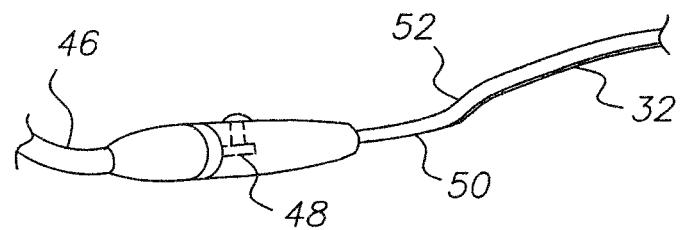
FIG. 1A
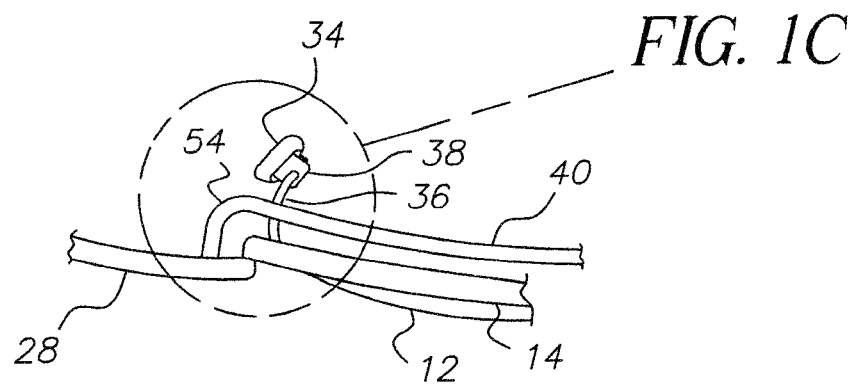
FIG. 1B
FIG. 1C

EYEWEAR

This application is a continuation of U.S. patent application Ser. No. 12/804,850, filed Jul. 30, 2010, which is herein incorporated by reference.

FIELD OF THE INVENTION

The present invention relates to eyewear, and particularly to eyewear which is suitable for routine use as well as within a mask without interfering with the operation of a mask, particularly the seal holding the mask against the skin of the head of the user.

Eyewear in accordance with the present invention is made up of a combination of parts of such shape as to provide resiliency to facilitate the putting on of the eyewear, comfort in wearing the eyewear, presenting a pleasing appearance by the eyewear, and enabling the eyewear to be used within a mask, such as an emergency air breathing mask, a gas mask, or a scuba mask, without interference with the donning of the mask or the seal which prevents the noxious substances, such as gas or water from penetrating the mask by breaking the seal.

BACKGROUND OF THE INVENTION

Prescription eyewear to be used within masks without interfering with the functioning of the mask has been a source of difficulty and the subject of many design attempts over the years. For the most part, these attempts have sought to assemble an eyeglass frame inside the mask as a part of the mask. See, for example, Schutz et al., U.S. Pat. No. 2,388,713 of Nov. 13, 1945; Rodenhouse, U.S. Pat. No. 2,905,172 of Sep. 22, 1959; Waldherr, U.S. Pat. No. 4,023,214 of May 17, 1977 and Erickson et al., U.S. Pat. No. 7,677,724 of Mar. 16, 2010. Routine use of frame designs for incorporation in masks is not achievable with these designs. By routine use is meant wearing of the prescription eyewear for general purposes. For example, the eyewear may be routinely used with other optical devices such as inside the eyepiece of such devices as in the case of periscopes.

The term eyewear as used herein includes frames which may carry lenses, for example, prescription lenses, which can be used within or outside an air breathing mask without interference with the operation of the mask. An air breathing mask enables the wearer to work in noxious gas environments or under water, for example as a scuba mask.

SUMMARY OF THE INVENTION

It is the principal advantage of the present invention that eyewear provided in accordance with the invention may be worn for routine use as well as in an air breathing mask without interference with the operation of the mask as by breaking the seal which prevents the external environment from undesirably penetrating the mask.

Another advantage of the invention is that the eyewear presents a pleasing appearance as well as is comfortable in routine use or within the mask.

Another feature of the invention is that the eyewear provided by the invention is compatible with the donning of the mask and remains in place and does not obstruct the vision of the user when donning the mask over the eyewear.

Other advantages of the invention are that the eyewear provided by the invention is suitable for routine wear as well as within a mask and is compatible with optical devices such as binoculars, periscopes, etc. and enable the eyewear to extend inside the eyepiece of the periscope or other optical device.

The combination of parts which provide eyewear in accordance with the invention uniquely enable effective performance of the eyewear both inside and outside a mask and especially without interference with the operation of a mask.

Briefly described, the present invention provides eyewear wearable on the head of a user inside a mask without interference with the operation thereof. The eyewear has a lens holding frame for holding lenses adjacent the eyes of the user's head and connected by a bridge across the user's nose. Flexible members bent arcuately around and in conformance with the sides of the head of the user have a kink whereby to facilitate acceptance between the sides of the head and the seal of the mask with sufficient tightness against the side of the head to limit movement of the frame and the space between the seal and the head thereby avoiding breaking of the seal when the mask is in operation.

The frame may be provided by resilient metal parts, such parts forming the kink transitioning from wires to flat sections, where the flat sections provide the arcuately bent flexible members.

The flexible members preferably extend inwardly along with the lenses toward the bridge between the lenses and are connected to the bridge via sections having further kinks which enhance the flexibility of the members.

BRIEF DESCRIPTION OF THE DRAWINGS

The foregoing and other objects, features and advantages of the invention will become more apparent from a reading of the following description in connection with the accompanying drawings in which:

FIGS. 1A, 1B, 1C, and 1D are enlarged views of portions of the eyewear shown in FIG. 1 and in the top view thereof shown in FIG. 7 so as to illustrate different parts of the eyewear in greater detail, as such the views of FIGS. 1A, 1B, 1C, and 1D are perspective views of fragmentary portions of the eyewear, as shown in FIG. 1 or 7;

DETAILED DESCRIPTION OF THE INVENTION

Figure 8:
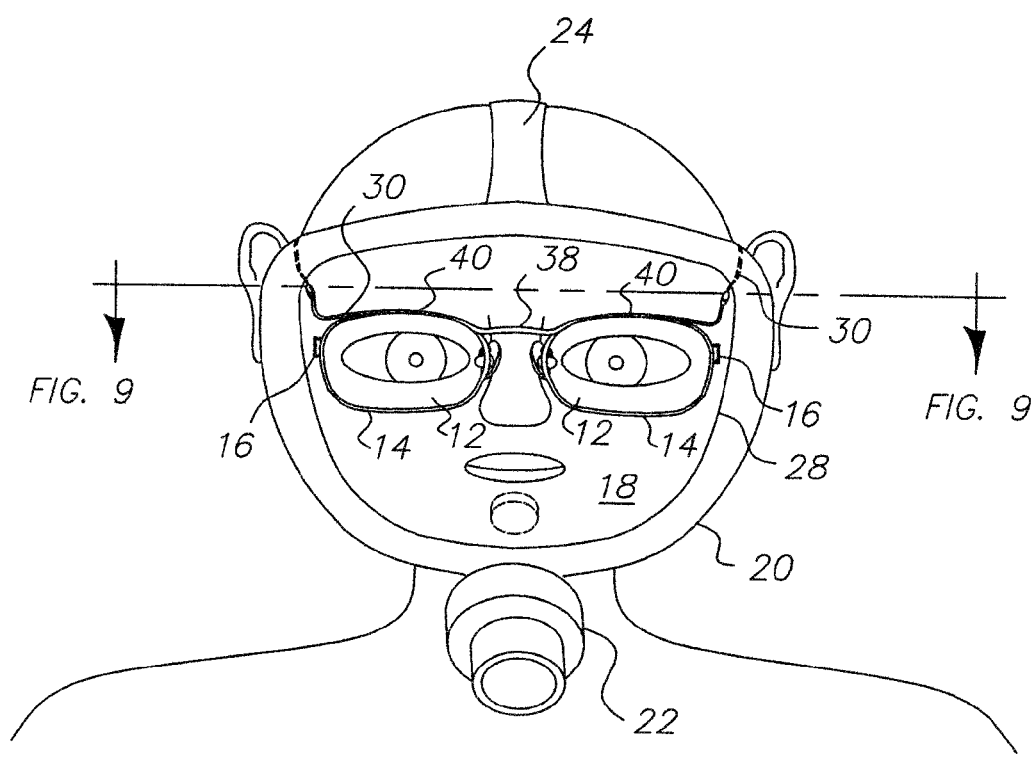
FIG. 8 is a front view showing the eyewear in a mask.
Figure 9:
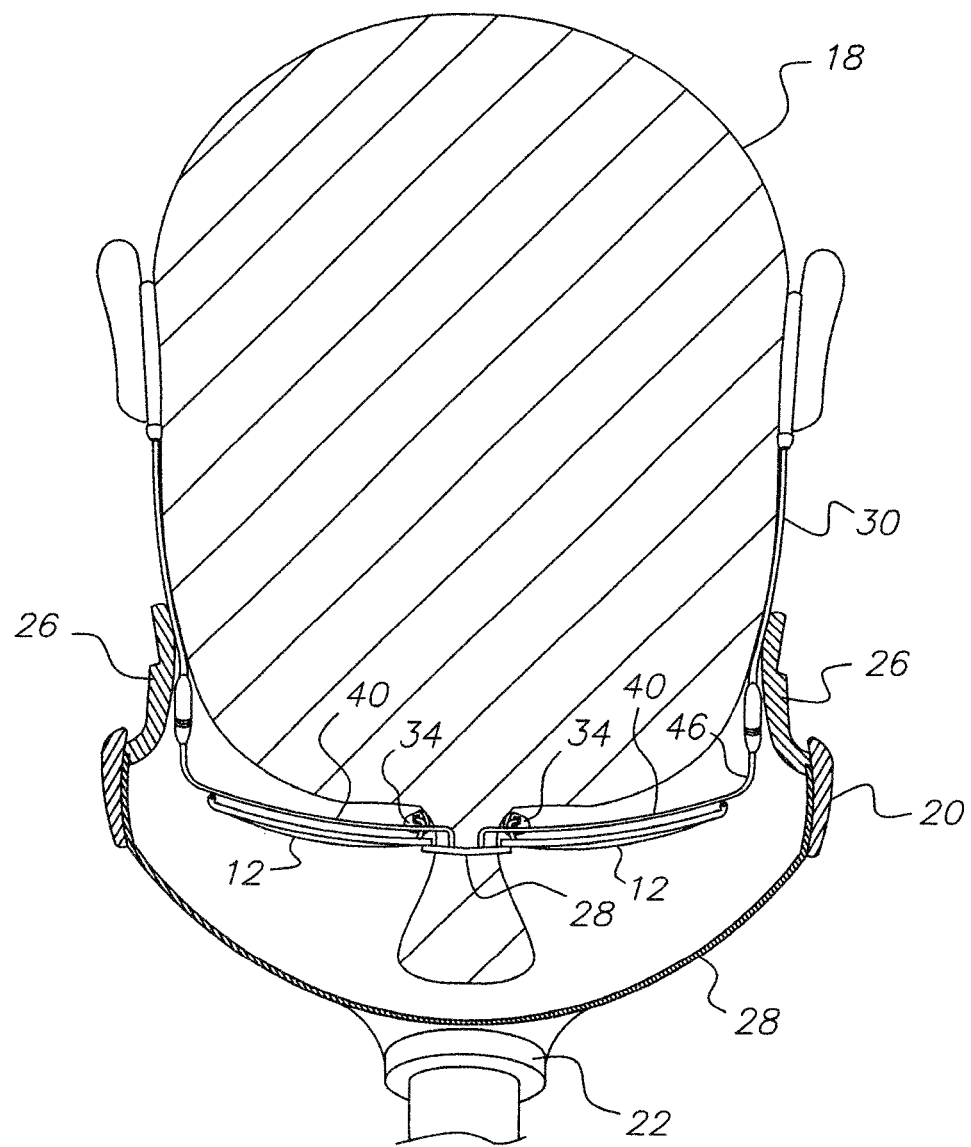
FIG. 9 is a sectional view of the eyewear in the mask, the section being taken along the line 9-9 in FIG. 8.

Referring more particularly to the drawings, an eyewear frame 10 embodying the invention is shown with the lenses 12 captured in lens holding sections 14 of the frame which can be opened and closed to enable installation of the frame by means of screw clamps 16. The lenses 12 and the lens holding sections 14 are disposed adjacent the eyes of the wearer 18 as shown in FIGS. 8 and 9 where the frame 10 is worn by the user inside a mask 20. This mask 20 is an air breathing mask of the type used as a gas mask or for emergency air breathing with fresh air entering the mask through a coupling 22. The frame 10 provided by the invention enables the mask 20 to be donned with ease and without interference with the frame 10. Straps 24 hold the mask 20 in place while the seal 26 around the visor section 28 of the mask is maintained without breaking the seal by virtue of the construction and design of the frame 10. Although mask 20 is shown as an emergency air breathing mask, the eyewear frame 10 may be worn with other masks, such as a scuba mask having seals along the right and left sides of the user head, e.g., at or near the temples.

Figure 5:
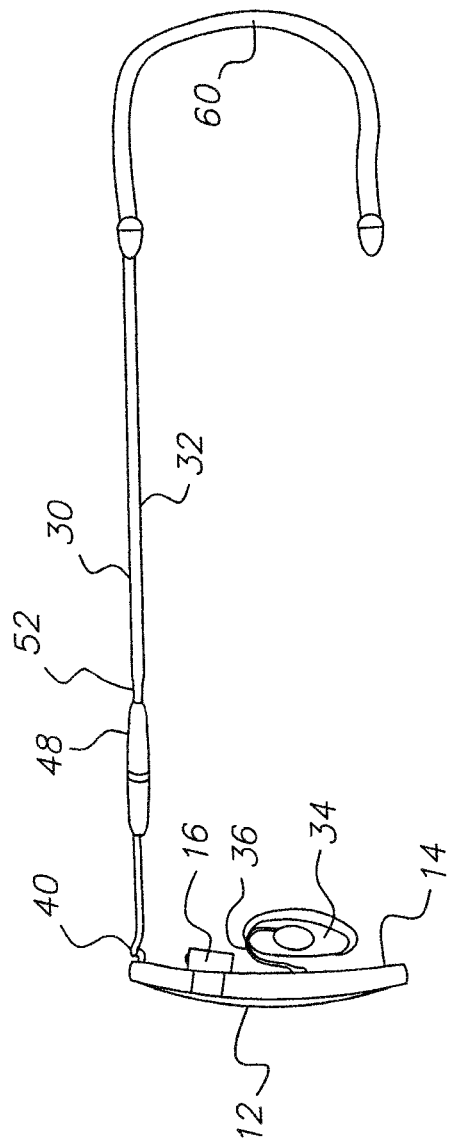
FIG. 5 is a right side elevational view of the eyewear of FIGS. 1-4.
Figure 6:
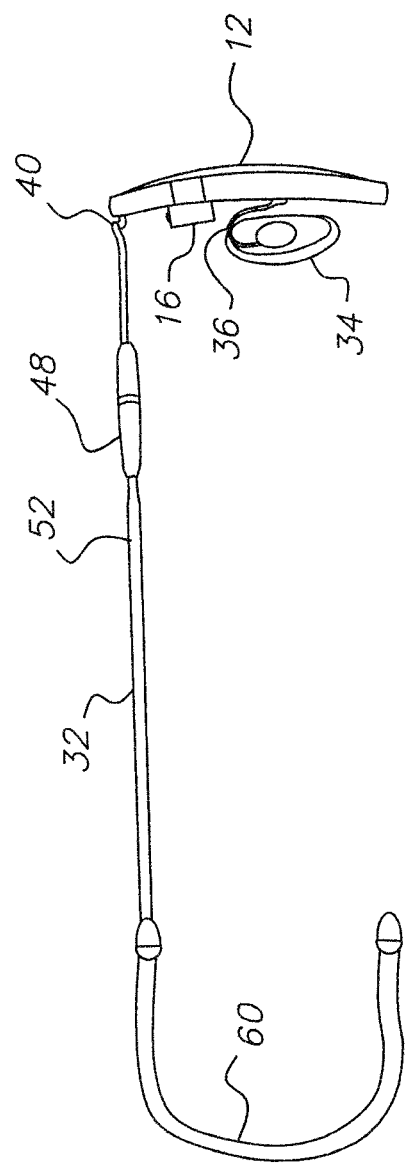
FIG. 6 is a left side elevational view of the eyewear shown in FIGS. 1-5.

The alignment and position of the lens sections 14 of the frame 10 is maintained by a bridge section 38 attached to each of the two lens sections 14 and extending there between across the nose region of the user. This bridge section 38 and the lens holding sections 14 are less narrow than flexible members 30 which are provided by wires having resiliency to hold the frame on the head of the user 18 (FIGS. 8 and 9). The wires of the flexible members 30 are flattened in temple sections 32 as shown in the side views of FIGS. 5 and 6. These wires are sufficiently narrow to provide flexibility during the donning and wearing of the frame 10 and enable the lenses 12 to be held in position on the head of the wearer 18 without movement or displacement so as to provide a comfortable fit without breaking the seal 26 of the mask 20 as shown in FIGS. 8 and 9.

Figure 1:
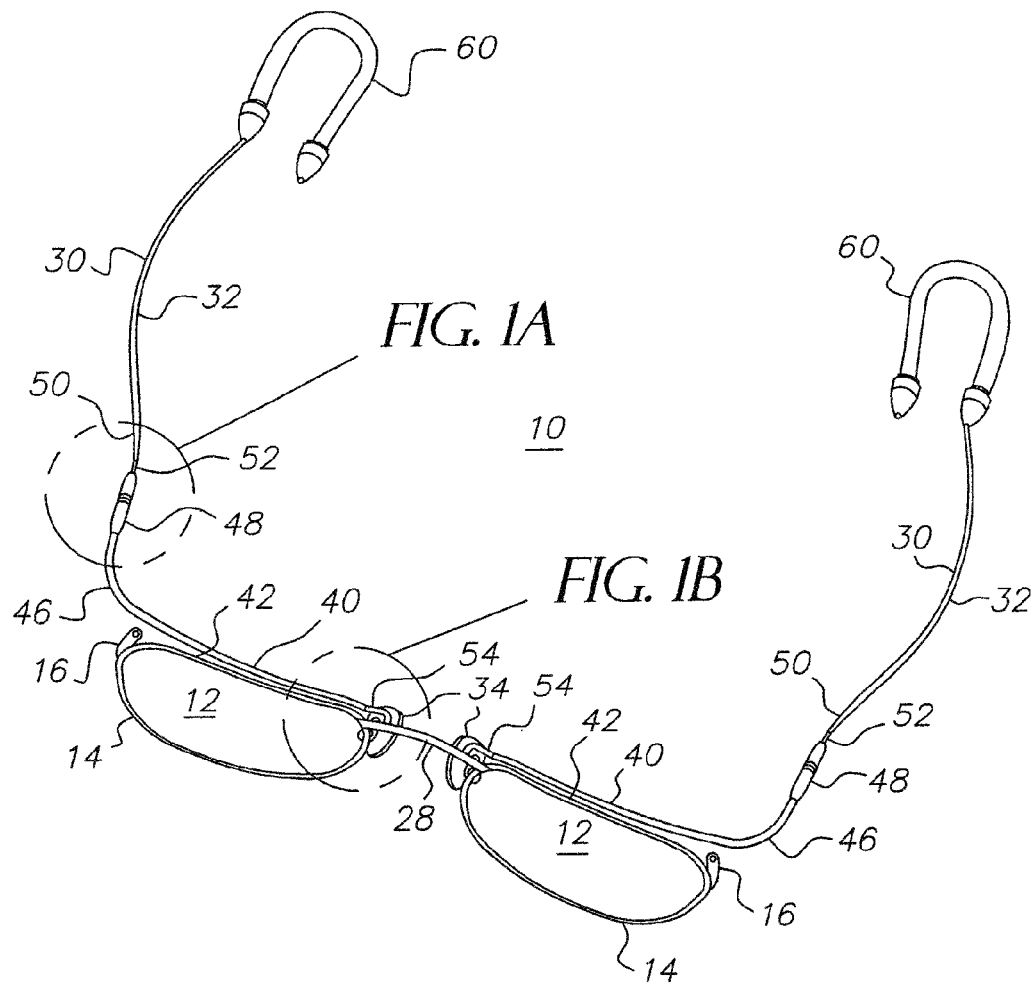
FIG. 1 is a perspective view looking downwardly from the right towards the top of eyewear embodying the invention.
Figure 1C:
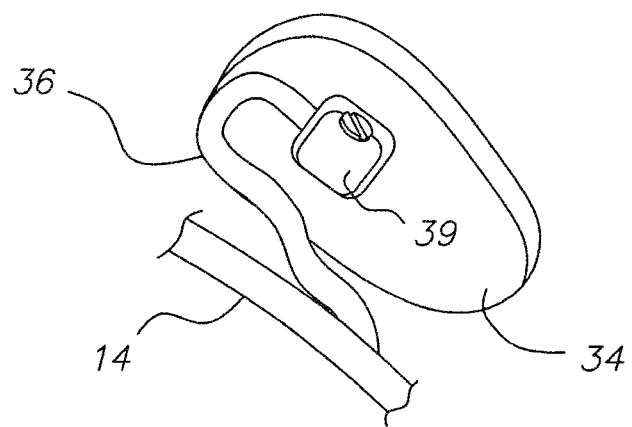
Figure 1D:
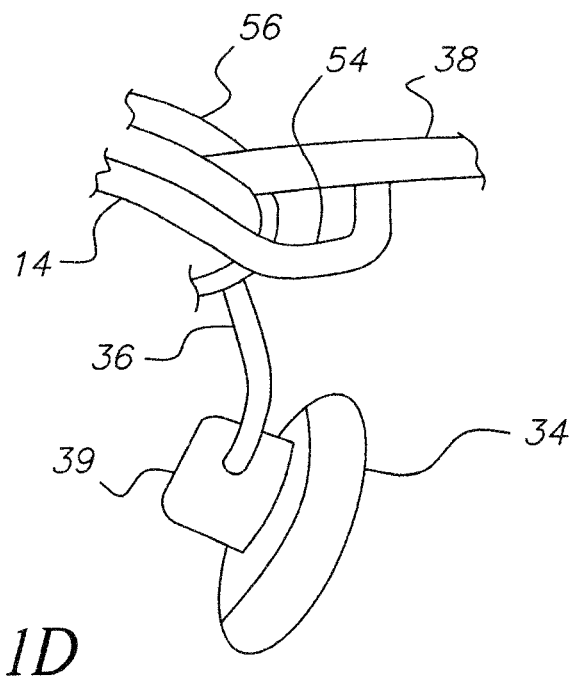

The frame 10 includes nose pads 34 which are also connected to lens holding sections 14 by wire loops 36 which are connected to the pads by screw clamps 39 (see FIGS. 1C and 1D).

The flexible members 30 have brow sections 40 which follow and conform to the brow and the upper edges 42 of the lens holding sections 14. The brow sections 40 at their outer ends 46 thereof, are bent approximately 90 degrees so that they extend rearwardly. The rearward of outer ends 46 are connected by way of hinge members 48 (see FIG. 1A) to the inside ends 50 of the temple sections 32 of flexible members 30.

This connection of the ends 50 provides a transition of the wire where it is round and then flattened in temple sections 30. This transition forms a kink 52 which lends itself to providing the requisite flexibility in the frame for comfort in wearing and placement on the head of the user (see especially FIG. 1A).

The inner ends 54 of the brow sections 40 are connected to the bridge section 38 via kink portions 56 (see FIG. 1D). These kink portions 56 as well as the curvature and flexibility of the brow sections 40 further enhance comfortable wearing of the frame on the head of the user by providing enhanced flexibility which would not otherwise be provided without the kink portions 56.

The rear ends of the temple sections 32 may be connected to hooked ear pieces 60 covered by soft material. The wires and strips providing the sections 14, 38, 40 and 30 of the frame 10 may be of resilient metal sufficiently thin to afford flexibility. This metal is preferably a stainless steel alloy or a titanium alloy.

Figure 2:
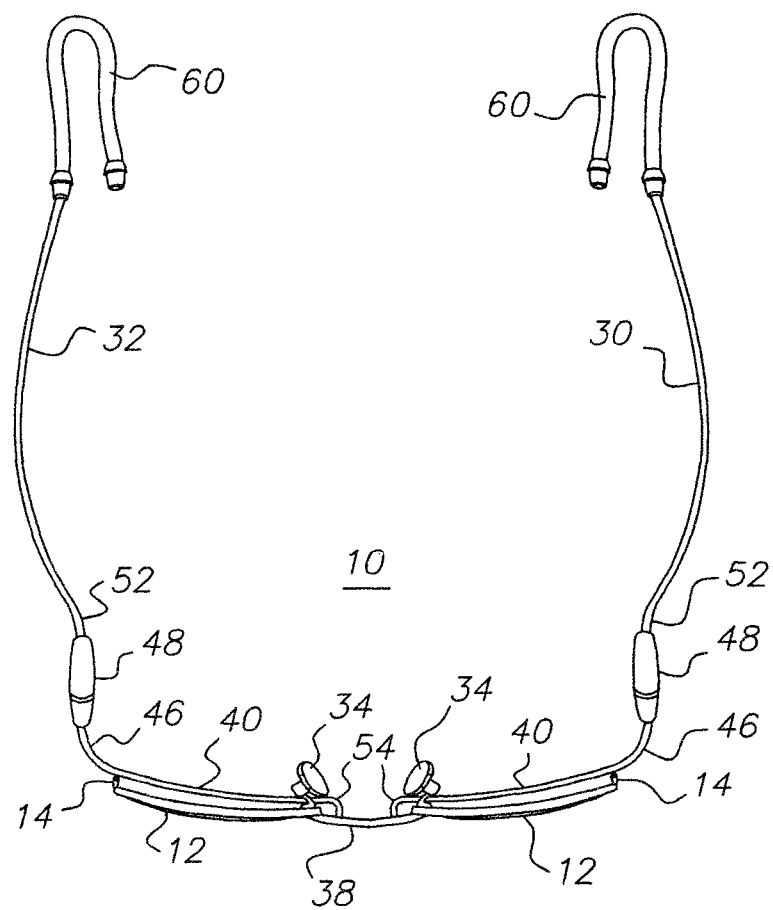
FIG. 2 is a bottom plan view of the eyewear shown in FIG. 1.
Figure 3:
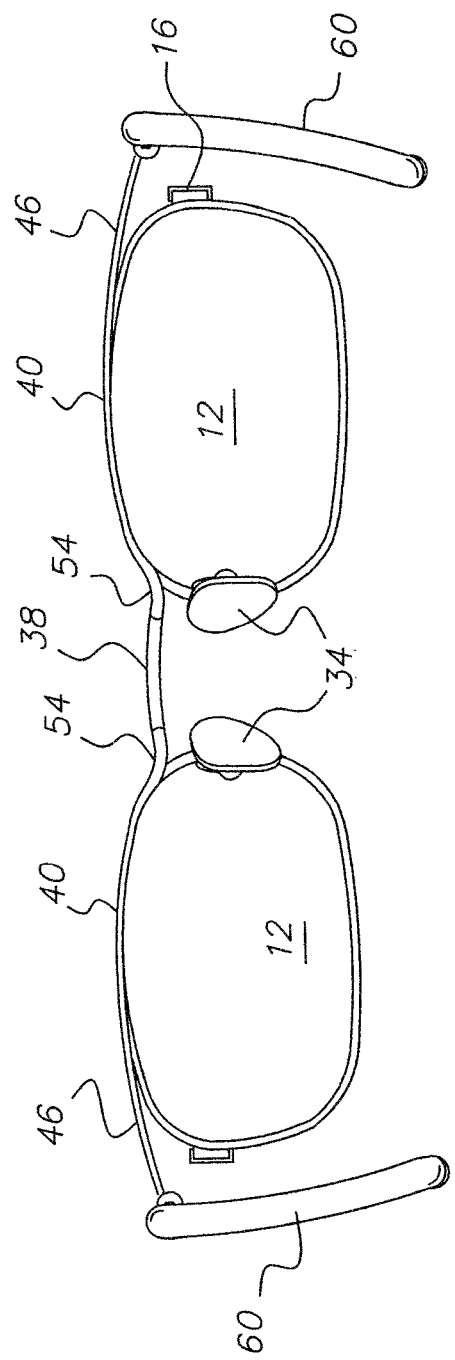
FIG. 3 is an elevational view taken from the rear of the eyewear shown in FIGS. 1 and 2.
Figure 4:
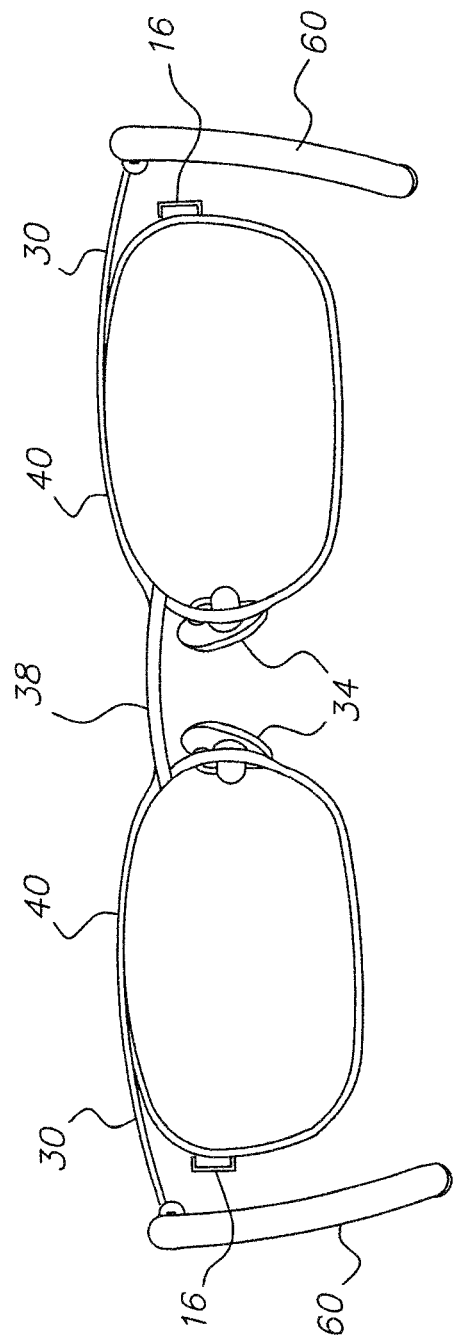
FIG. 4 is an elevational view similar to FIG. 3 but taken from the front of the eyewear.
Figure 7:
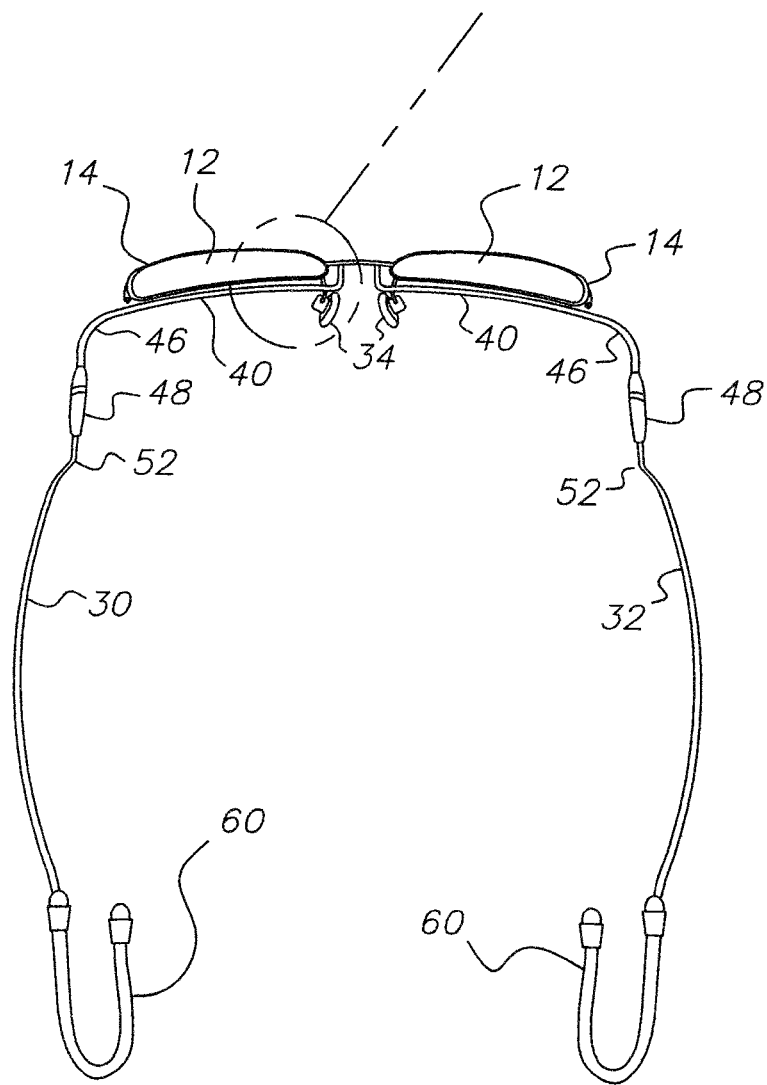
FIG. 7 is a top plan view of the eyewear shown in FIGS. 1-6.

As best shown in FIGS. 1, 2, and 7, the left and right flexible members 30 mirror each other along opposite sides of bridge section 38, and each of the left and right flexible members 30 comprise the left or right brow sections 40, respectively, and left or right temple sections 32, respectively, coupled by one of the hinges 48.

In summary, the eyewear frame 10 is suitable for routine wear and within masks having seals which enable the masks to prevent noxious environmental gases or penetration by water from being breathed, and are connected such as by a hose to a source of air or other breathing mixture, such as shown by connection 22. The frame 10 is made up of resilient metal parts including wires to provide the frame with a shape, which facilitates the placement of the eyewear on the head of the user while limiting the movement of the eyewear when in use so as to avoid breaking the seal of a mask inside of which the eyewear is disposed when the mask is donned by the user. In particular, the frame 10 has lens holding sections 14, and brow sections 40 that follow the shape of the eye and brow of the user at the upper edge of the sections 14. These lens holding sections 14 are connected to each other by a bridge section 38 which attaches to each of the two sections 14 and extends across the nose region of the user. Brow sections 30 are attached at their inner ends to the bridge section 38 and extend inwardly of the lenses and generally conform to the shape of the brow edges. The outer end of each brow section 40 turns rearwardly and attach to one of temple sections 32 of the frame 10 via a hinge 48.

The temple sections 32 each have a kink 52 along a transition 50 (i.e., round to flat) where the temple section is attached to hinge 48 so as to enable the temple section 32 to be bent outwardly along an arcuate curve which generally conforms to the shape of the sides of the user's head thereby facilitating passage of the temple section 32 toward the ears of the user without affecting the integrity of the seal of a mask when the eyewear is used in the mask. Preferably, the inner end of each of brow section 40 has a kink 54 near its attachment to bridge section 38 which enhances the flexible movement of the brow sections 40. This flexible movement facilitates placing the eyewear on the head of the user as well as restricting movement of the eyewear when worn by the user. Such flexibility also makes the eyewear comfortable when worn in routine use as well as inside a mask without interfering with the functioning of the mask.

From the foregoing description it will be apparent that there has been described herein improved eyewear especially adapted to be used with masks which seal against the head of the user and without interference with the seal when the mask is in place on the head of the user over the eyewear. Variations and modifications in the herein described eyewear, within the scope of the invention, will undoubtedly suggest themselves to those skilled in the art. Accordingly, the foregoing description should be taken illustratively, and not in a limiting sense.

What is claimed is:

1. Eyewear wearable on the head of a user and inside a mask without interference with the operation of the mask which eyewear comprising:

a lens holding frame for holding lenses adjacent to the eyes of the user's head; and two flexible members extend from said frame to rearwardly arc along a bend and then outwardly along an arcuate curve along the sides of the user's head, said flexible members changing in shape after said bend to being flat in conformance with the side of the head and held sufficiently tightly against the sides of the head to limit movement of the frame and avoid breaking of a seal of a mask when worn by the user.

2. The eyewear according to claim 1 wherein said lens holding frame is disposed in a vertical orientation, and said flexible members are round after said bend and then flat in a horizontal orientation when extending outwards along said arcuate curve.

3. The eyewear according to claim 1 wherein said flexible members have hooked ends for wrapping around the ears of the head of the user, said lens holding frame is disposed in a vertical orientation, and said flexible members are round after said bend and adjacent thereto and then flat in a horizontal orientation when extending outwards along said arcuate curve to said hooked ends.

4. The eyewear according to claim 1 wherein said flexible members each have a hinge member between said bend and said arcuate curve of the flexible member.

5. The eyewear according to claim 1 wherein said lens holding frame has right and left lens holding sections, and a bridge section extending between said right and left lens holding sections, and said flexible members each extends away from said bend along said face and then inwardly to connect to said bridge section.

6. The eyewear according to claim 1 wherein said flexible members each extends inwardly to connect to said bridge section via a kink in the flexible member.

7. Eyewear wearable on the head of a user and inside a mask without interference with the operation of the mask which eyewear comprising:
- a lens holding frame for holding lenses adjacent to the eyes of the user's head;
- two ear pieces;
- two flexible members each extending from a different side of said frame, each of said flexible members comprises:
- a first section outwardly extends from said frame along said face and then bends to further extend partly along the side of the head;
- a second section extends outwardly along an arcuate curve along the side of the head to a different one of said ear pieces; and
- a hinge member connecting said first section and said second section, and said second section being flat at least adjacent said hinge member in conformance with the side of the head and held sufficiently tightly against the sides of the head to limit movement of the frame and avoid breaking of a seal of a mask when worn by the user.

8. The eyewear according to claim 7 wherein said second section adjacent said hinge member transitions in shape from being round to flat to enable said second section to conform with the side of the head and to be held sufficiently tightly against the sides of the head along a seal of a mask when worn by the user.

9. The eyewear according to claim 7 wherein said second section adjacent said hinge member transitions in shape from being round to flat to a different one of said ear pieces.

10. The eyewear according to claim 7 wherein said lens holding frame has right and left lens holding sections, and a bridge section extending between said right and left lens holding sections, and said flexible members each extends inwardly to connect to said bridge section.

11. The eyewear according to claim 10 wherein said flexible members each extends inwardly to connect to said bridge section via a kink in the flexible member.

12. The eyewear according to claim 7 wherein resilient metal parts provide said frame, and said first section and said second section of each of said flexible members.

13. The eyewear according to claim 12 wherein said metal is alloyed stainless steel or titanium having a thickness to be flexible to conform to and be yieldable with respect to brows of the user and the sides of the head of the user.

\* \* \* \* \*